United States Patent [19]
Bird et al.

[11] Patent Number: 4,991,770
[45] Date of Patent: Feb. 12, 1991

[54] THERMOSTAT WITH MEANS FOR DISABLING PID CONTROL

[75] Inventors: Douglas D. Bird, Dayton; Daniel T. Uhrich, Mayer, both of Minn.

[73] Assignee: Honeywell Inc., Minneapolis, Minn.

[21] Appl. No.: 499,877

[22] Filed: Mar. 27, 1990

[51] Int. Cl.$^5$ ............................................. G05B 13/02
[52] U.S. Cl. ................................. 236/44C; 236/78 D; 318/610; 364/162
[58] Field of Search .................. 236/78 D, 46 R, 44.6; 364/160, 162, 557; 318/610; 165/12

[56] References Cited

U.S. PATENT DOCUMENTS

| | | | |
|---|---|---|---|
| 3,938,017 | 2/1976 | Hayes | 236/78 D X |
| 4,615,380 | 10/1980 | Beckey | 236/46 R |
| 4,702,413 | 10/1987 | Beckey et al. | 236/46 R |
| 4,848,099 | 7/1989 | Beckey et al. | 236/78 D X |

FOREIGN PATENT DOCUMENTS 0163102 8/1985 Japan ............................. 236/78 D Primary Examiner—William E. Wayner
Attorney, Agent, or Firm—Robert B. Leonard

[57] ABSTRACT

A thermostat is disclosed which includes a Proportional-Integral-Derivative (PID) controller and a means for disabling the PID controller for selected periods. The PID controller is disabled during a temperature recovery period, which can be triggered by the occurrence of one or more of many preselected events. The PID controller is re-enabled when the thermostat setpoint less a void offset temperature is reached. To reduce error in future temperature recovery periods, the void offset temperature is adjusted after a temperature recovery by adding the amount of error to the void offset temperature to create a new void offset temperature for use in a next temperature recovery period.

13 Claims, 4 Drawing Sheets

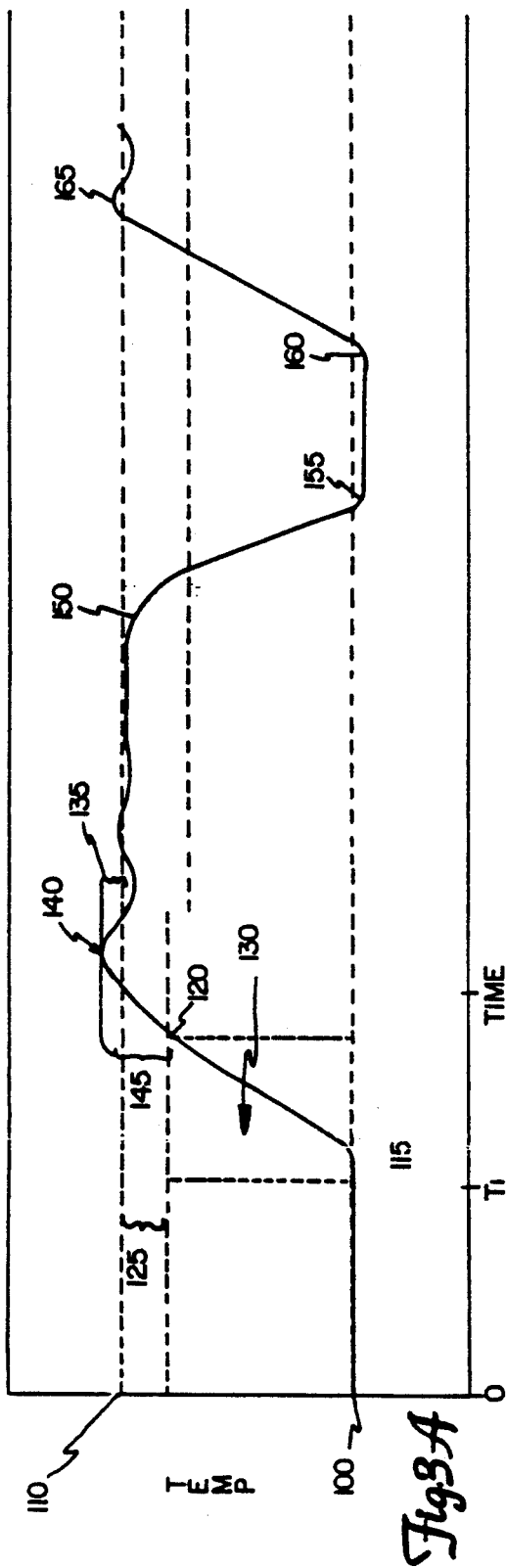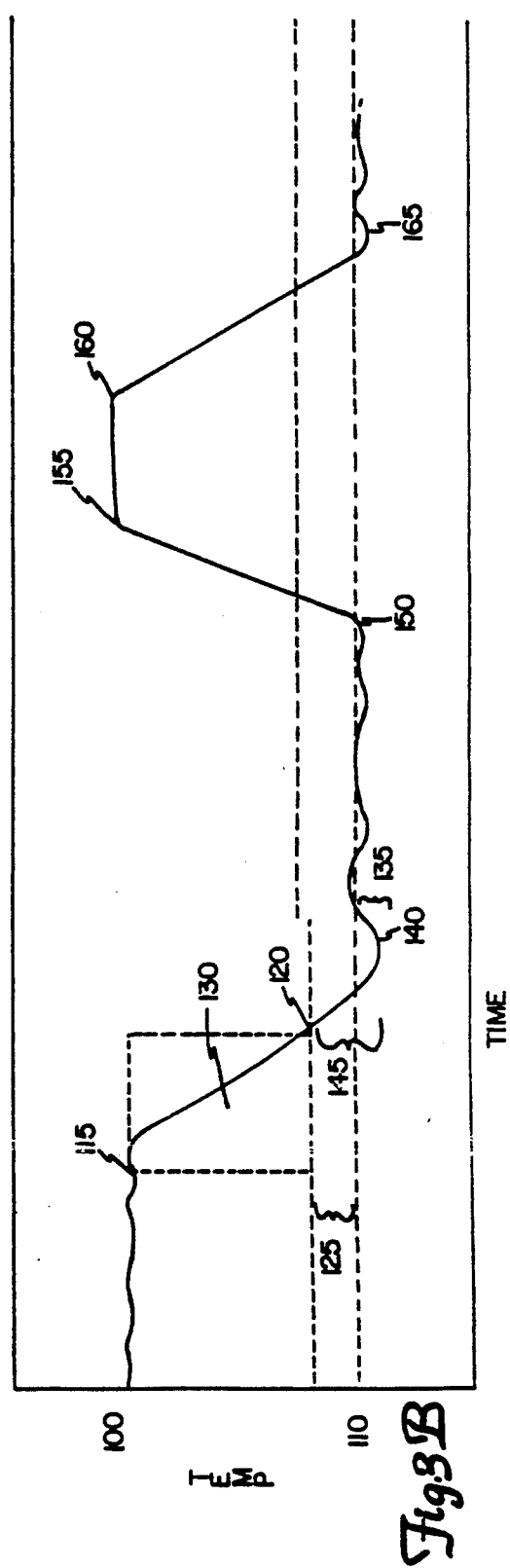

THERMOSTAT WITH MEANS FOR DISABLING PID CONTROL

BACKGROUND OF THE INVENTION

The present invention relates to temperature control devices and more specifically to thermostats using Proportional-Integral-Derivative (PID) controllers.

The heating and cooling of an enclosed space has become a highly developed art. However, the present high cost of energy required to run heating and cooling systems dictates that these systems operate no more than is necessary to keep the enclosed space at a desired temperature. In addition, many enclosed spaces such as residences and commercial buildings do not need to be kept at a constant temperature throughout the day and night.

Many systems have been developed to minimize the operation time of heating and cooling systems to that necessary to maintain a comfortable temperature in the enclosed space. U.S. Pat. No. 4,615,380 ('380) issued to Beckey and assigned to the assignee of the present invention, is an example of such a system and is incorporated herein by reference. The Beckey ('380) patent teaches a thermostat which includes a Proportional-Integral-Derivative (PID) controller.

The PID controller is a well known device for use in control systems to reduce the error found in a control system. In a thermostat, the PID controller serves the purpose of reducing the amount of steady state error, where the steady state error is defined as the variation of room temperature from the thermostat set point temperature over time. The PID controller calculates the amount of error between the temperature of the enclosed space and the setpoint of the thermostat, the rate of change of the error which is the derivative of the amount of error, and the sum of past errors which is the integral of the amount of error. These three signals are all multiplied by preselected constants and are then combined to produce a signal which affects when the heater or cooler is turned on or off. By looking at the amount of error, the sum of past errors, and the rate of change of error, and combining these factors into a decision on when to turn on or off a heater or cooler, the peak error and the sum of past error can be reduced in the future.

In the Beckey ('380) patent, a further method for reducing error is disclosed. The amount of overshoot is used to adjust the preselected constants used to determine the proportions of error, the rate of change of the error and the total error to be used in the feedback signal.

The Beckey ('380) patent also discloses a thermostat for varying the temperature of an enclosed space over time. A clock and memory are included in the thermostat. A microprocessor checks the current time, checks what the temperature should be at that time, and determines if the enclosed area is at the proper temperature for that time. If the enclosed area is below the proper temperature for that time in a heating application, the heater will be turned on. In a cooling application if the enclosed area is above the proper temperature for that time, the cooler will be turned on.

A typical residence temperature profile is shown in FIG. 1. The profile represents the thermostat setpoint temperature versus time. Note that the nighttime temperature is kept at about 60°F. Around 5:00 a.m., a gradual warm up, in the form of a temperature ramp, is desired so that at wake up time of 7:00 a.m., the house will be at a comfortable temperature. After the house has been vacated at 9:00 a.m., the temperature is allowed to drop some. At 3:00 p.m., a gradual warming again is desired so that when the house is again occupied, it will be at a comfortable temperature. At 10:00 p.m., when the occupants are going to bed, the temperature is returned to the night time level.

A problem exists during the recovery periods in that thermostats, including those employing PID controllers, may cause cycling from on to off and off to on of the heater or cooler. This adds cost to the operation of the heater and also can cause more noise.

One attempted solution to the problem of cycling can be found in U.S. Pat. No. 4,702,413 ('413) issued to Beckey et al. The Beckey et al. ('413) patent teaches the use of a variable temperature ramp as the thermostat set point during a temperature recovery period. Once the temperature recovery period began, the heater was locked on. However, once the temperature of the enclosed area rose above the thermostat setpoint, the heater was no longer locked on. The temperature of the enclosed space was able to rise above the thermostat set point either during the temperature recovery period or after a temperature recovery period. If the temperature of the enclosed space rose above the thermostat set point during the temperature recovery, undesirable cycling would once again occur. Further, if the heater was locked on until the temperature of the enclosed space rose above the thermostat setpoint after a temperature recovery period, thermal momentum could cause the temperature of the enclosed space to overshoot the thermostat setpoint. Or, if the temperature recovery period began too late, the temperature of the enclosed space may be too low or undershoot the desired temperature at the time to end the temperature recovery period. To correct for overshoot or undershoot in either situation, the amount of overshoot or undershoot was used to adjust the slope of the ramp.

It is an object of the present invention to provide a thermostat which minimizes temperature overshoot or undershoot while preventing cycling of the heater or cooler during a temperature recovery period while still achieving the desired temperature.

SUMMARY OF THE INVENTION

The present invention is a thermostat which includes a PID controller and a means to disable the PID controller during a temperature recovery to a desired temperature. The PID controller is locked off and the plant is locked on until a temperature s reached which differs from the desired temperature by a void offset temperature. The void offset temperature can be adjusted following the temperature recovery by adding the amount of overshoot to the void offset temperature to create a new void offset temperature. The new void offset temperature is then used in the next recovery period.

BRIEF DESCRIPTION OF THE DRAWINGS

FIG. 3a is a time versus temperature plot which focuses on a heating recovery period.

FIG. 3b is a time versus temperature plot which focuses on a cooling recovery period.

FIG. 4 is a flowchart which depicts the process used to disable and re-enable the PID controller and to lock the plant on.

DETAILED DESCRIPTION OF THE DRAWINGS

Figure 2:
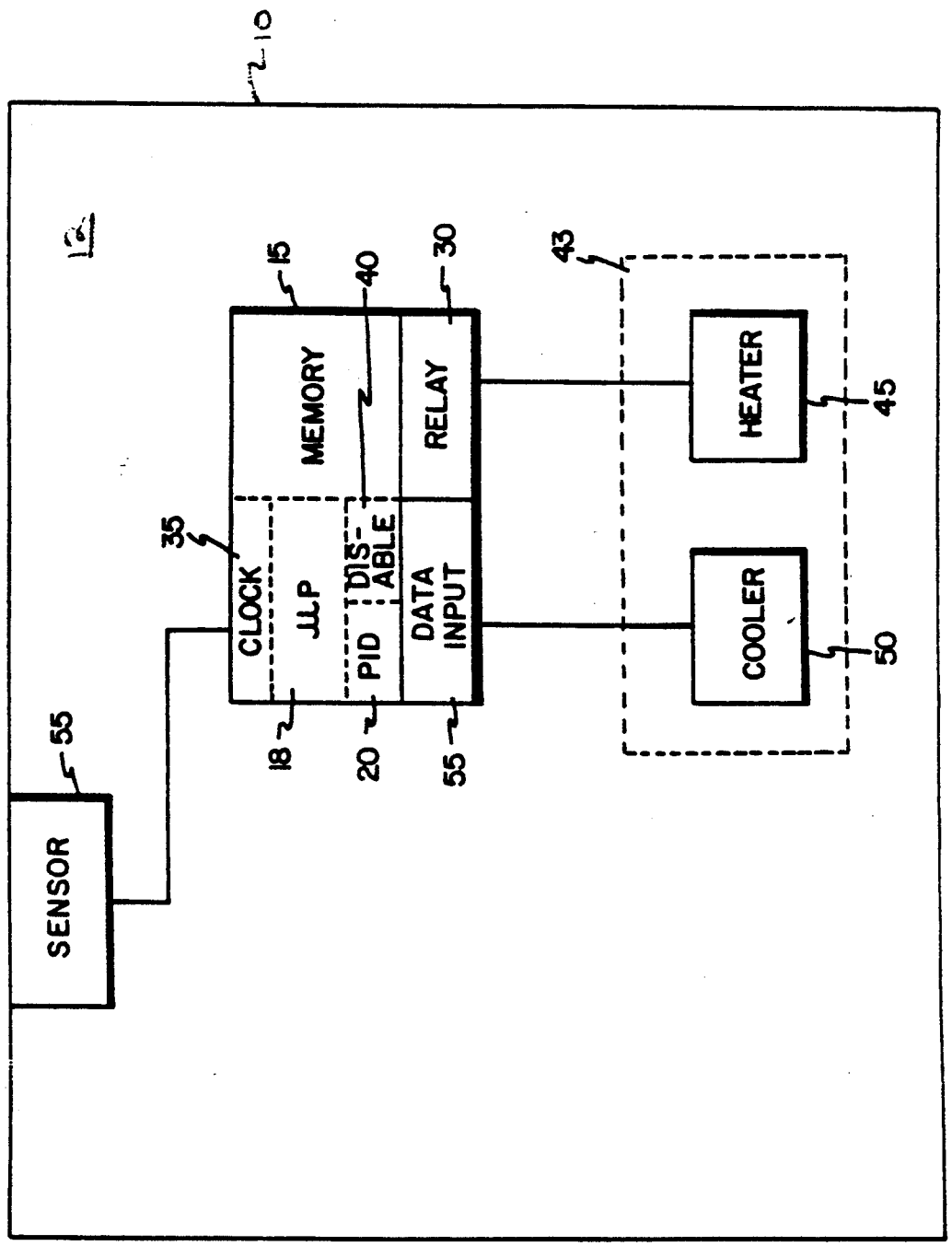
FIG. 2 is a block diagram of a space including a heating and cooling system having a thermostat control.

Referring now to FIG. 2, thereshown is a building 10 defining an enclosed area 12. The enclosed area 12 is heated or cooled by a plant 43. Plant 43 is comprised of either a heater 45, a cooler 50 or both. The heater or cooler is turned on and off by commands sent from a thermostat 15. The thermostat can be set to cause the heater 45 to provide heat to the enclosed area, or to cause cooler 50 to provide cooling to the enclosed area until the temperature in the enclosed area reaches a desired temperature. The thermostat is connected to a sensor 55 so that the thermostat can receive a signal which is indicative of the temperature of the enclosed area.

The thermostat 15 can be comprised of a microprocessor 18, a PID controller 20, a memory 25, a relay 30, a clock 35 and a means for disabling the PID controller 40 and a data input means 55. The interrelationship of these parts will now be described.

Figure 4:
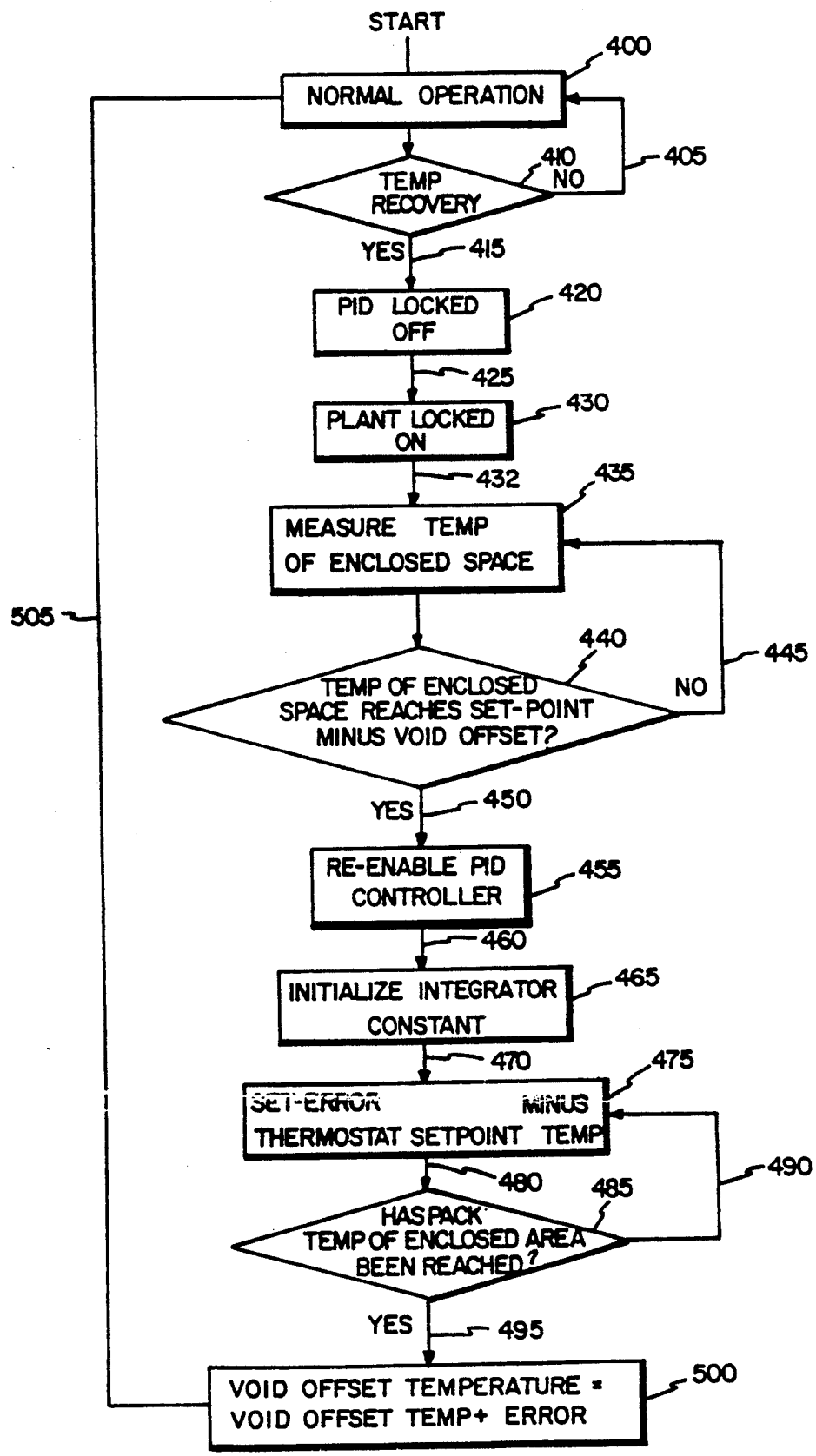

Microprocessor 18 is designed to perform the steps shown in FIG. 4. Microprocessor 18 may include a means for comparing two or more numbers (not shown).

Data input means 55 is used to create a thermostat setpoint temperature to be stored in memory 25. The thermostat setpoint temperature can be varied with time and is representative of a desired temperature for an enclosed area at a particular time.

Memory 25 is used to store values for the thermostat setpoint, the temperature of the enclosed space, and the void offset temperature. All three of these values are used by the means for disabling a PID controller 40 to determine when the PID controller should be enabled and when it should be disabled.

Relay 30 is controlled by PID controller 20. By appropriate connections of relay 30, plant 43 can be switched on or off as required by the PID controller.

Figure 1:
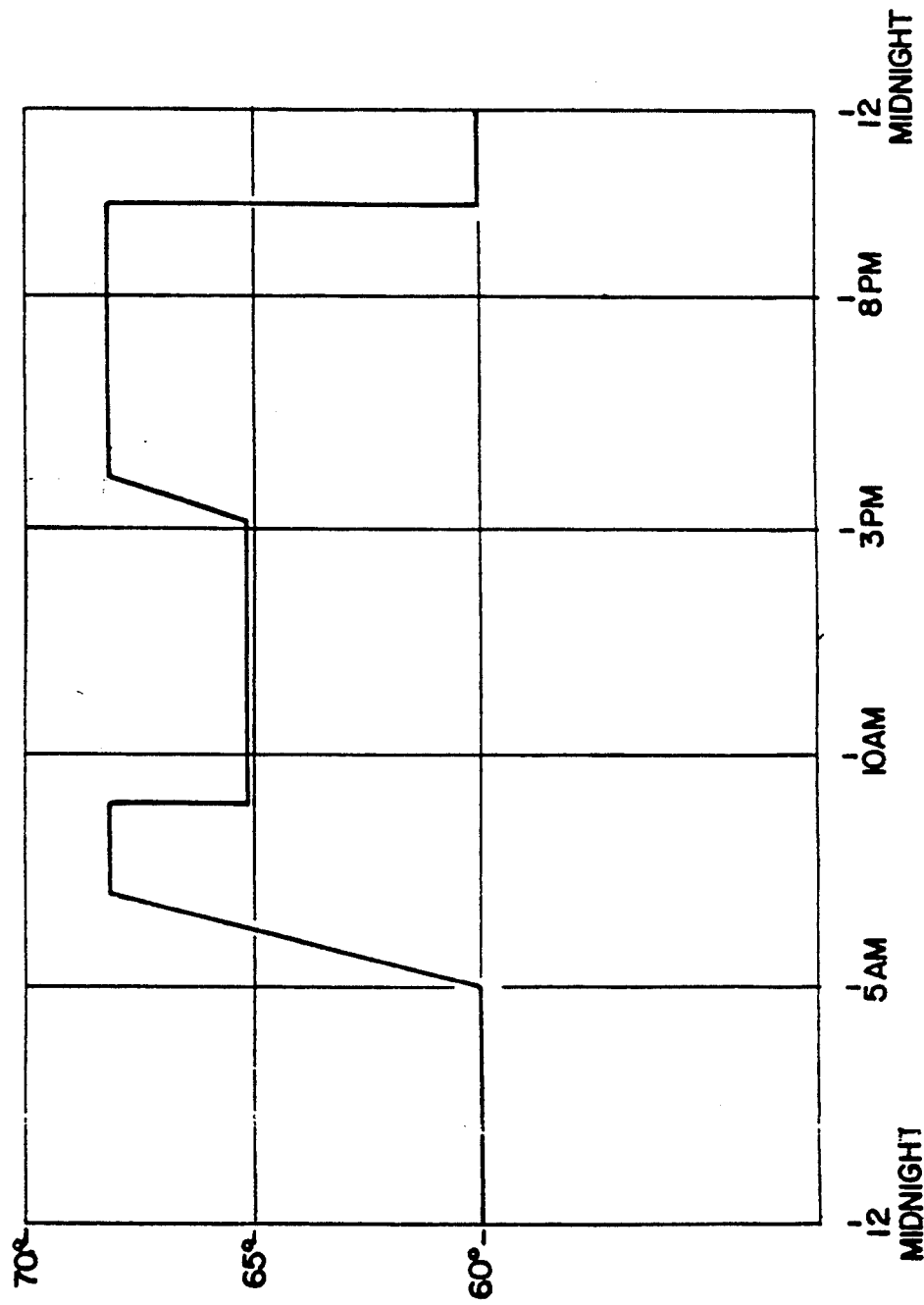
FIG. 1 is a temperature versus time plot of a sample temperature profile for a residence.

Clock 35 is used in conjunction with memory 25 so that PID controller 20 and means for disabling a PID controller 40 know what the current temperature for the enclosed space should be. The temperature profile of a space disclosed in FIG. 1 is dependent upon time.

The PID controller is a well known device for use in control systems to reduce the error found in a control system. In a thermostat, the PID controller serves the purpose of reducing the amount of steady state error, where the steady state error is defined as the excess of room temperature over the thermostat set point temperature. The PID controller calculates the amount of error between the temperature of the enclosed space and the setpoint of the thermostat, the rate of change of the error which is the derivative of the amount of error, and the total error which is the integral of the amount of error. These three signals are all multiplied by preselected constants and are then combined to produce a signal which effects when the heater or cooler is turned on or off.

Turning now to FIG. 3a, thereshown is a time versus temperature plot of the temperature of an enclosed space when the heating system includes a thermostat having a means for disabling a PID controller. It is to be noted, that a temperature recovery period may be triggered by one or more of many preselected events. Time, exceeding a preselected temperature, exceeding a preselected humidity, exceeding a preselected temperature and humidity discomfort index, or exceeding a preselected number of occupants of an enclosed area, and many more events could be used to trigger a temperature recovery period.

The means for disabling 40 shuts off the PID controller and locks the plant, in certain situations. For this embodiment, time will be used to trigger a temperature recovery period. FIG. 3a shows a heating recovery period in a thermostat using a PID controller and a means for disabling the PID controller. Note that for the inventive thermostat, the thermostat setpoint temperature does not ramp. The thermostat set point is at either first level 100 or second level 110. At time equal to zero, it can be seen that the temperature of the enclosed space is at a first level 100. At time T1, we encounter a temperature recovery period. At this point, the means for disabling a PID controller 40 locks the PID controller off and locks the heater 45 on. A PID void area is represented in FIG. 3a by dashed box 130. As the temperature rises towards the second level, thermostat setpoint 110, the temperature crosses through a point 120 which is equal to the thermostat setpoint temperature 110 less a void offset temperature 125. At point 120, the PID controller is re-enabled and the plant is no longer locked on. The PID controller then causes the temperature of the enclosed space to rise toward the thermostat setpoint temperature 110. Generally, because of some thermal momentum, the temperature of the enclosed space will surpass the thermostat setpoint temperature until it reaches a peak enclosed area temperature 140. At the point where the the enclosed area temperature is at a greatest difference from the thermostat setpoint temperature plus the void offset temperature, an overshoot value is measured and stored in memory 25. If the temperature of the enclosed space is less than the thermostat setpoint temperature, the error signal is called undershoot and will have a negative value.

In order to reduce the error, which can be overshoot or undershoot, of the temperature of the enclosed area during future recovery periods, the overshoot or undershoot value is added to the void offset temperature 125 thus creating a new void offset temperature 125'. The new void offset temperature 125' is then used in a future heat recovery period. By so modifying the void offset temperature for the next temperature recovery period, the heater or cooler will continue to be locked on until the temperature of the enclosed area is closer to the thermostat setpoint temperature than was the case in the present period.

When a thermostat of the present invention is connected to a cooling instead of a heating system, the time versus temperature plot of FIG. 3b is applicable. When cooling instead of heating, a temperature recovery will require a drop in temperature. This is accomplished by turning on the cooler until the desired temperature is reached. The operation of the thermostat during a cooling period is essentially the same as during heating except that the PID controller will be re-enabled when the temperature of the enclosed space drops below the thermostat setpoint temperature plus the void offset temperature. Modification of the void offset temperature for future cooling recovery periods is essentially the same as during heating.

Referring now to FIG. 4, thereshown is a flowchart which in general describes the operation of the present invention. The microprocessor performs the steps shown in FIG. 4. At block 400, the thermostat is in a normal operation mode. The next step is to decide if a temperature recovery period has been triggered, as shown at block 410. If a temperature recovery has been triggered, arrow 415 indicates that the next step is to lock off the PID controller as shown in block 420. If a temperature recovery period has not been triggered, then, as arrow 405 indicates, the thermostat remains in normal operation at block 400.

Once the PID controller has been locked off in block 420, Arrow 425 leads to the next step which is to lock the plant on, as shown in block 430. Next, according to arrow 432 is a measurement of the enclosed space as shown in block 435. Arrow 437 leads us to the next decision block 440.

Once the heat has been locked on and the PID controller has been locked off, the thermostat 15 must decide when to turn the PID controller back on. As was stated earlier, the PID controller is re-enabled when the temperature of the enclosed space is greater than the thermostat setpoint minus the void offset temperature. Block 440 shows this decision being made. If the condition of block 440 is not met, the PID controller remains locked off and the heat remains locked on, as indicated by arrow 445 returning the system to measurement of the temperature of the enclosed area at block 435. If the condition for re-enabling the PID controller is met, then as indicated by arrow 450, the PID controller is re-enabled at block 455.

Arrow 460 then leads to an optional block in this system. Block 465 re-initializes the integrator constant value. By proper choice of the integrator constant value, the time required to settle an error signal to zero is reduced. Next, arrow 470 leads to block 475, where an error signal is defined as equal to the difference between the thermostat setpoint temperature and the temperature of the enclosed area.

Arrow 480 then leads us to the next decision block 485. Since we want to minimize the overshoot or undershoot in the next temperature recovery period, a new void offset temperature will be created. The amount of error when the temperature reaches a maximum over the thermostat setpoint temperature minus the void offset temperature will be used to adjust the old void offset temperature to create a new void offset temperature. This is shown in block 485. If the maximum temperature of the enclosed area has not been reached, then as arrow 490 indicates, the thermostat continues to measure the amount of error at block 475. If the condition of block 485 has been satisfied, then as arrow 495 indicates, a new void offset temperature is created which is equal to the old void offset temperature plus the error in block 500.

Lastly, as indicated by arrow 505, the thermostat returns to normal operation at block 400.

The foregoing has been a description of a novel thermostat which includes a means for disabling a PID controller during a heating or cooling recovery period. The inventors do not intend to be limited by the foregoing description, but instead define their invention in the claims appended hereto.

We claim:

1. A thermostat for minimizing deviation from a first preselected temperature during a temperature recovery period wherein a plant is used to change the temperature of a space, comprising:

a memory adapted to receive, store and output first and second preselected temperatures and a new second preselected temperature;

a PID controller connected with said memory;

a means for disabling a PID controller connected with said PID controller and said memory, said means for disabling being adapted to disable said PID controller and lock on the plant during the temperature recovery period until a second preselected temperature is reached;

a comparator in communication with said memory, said comparator being adapted to generate an error signal which is equal to the difference between a current room temperature and said first preselected temperature when said current room temperature first reaches said second preselected temperature and then reaches a maximum difference from said second preselected temperature;

a means for modifying said second preselected temperature connected to said comparator, said means for modifying being adapted to subtract said error signal from said second preselected temperature to create a new second preselected temperature for use in a next temperature recovery period.

2. A thermostat for minimizing overshoot of a desired room temperature during a temperature recovery period, comprising:

a PID controller;

a means for disabling said PID controller in electrical communication with said PID controller, said means for disabling being adapted to operate during the temperature recovery period until the room temperature is equal to said second preselected temperature and further being adapted to lock a plant on during said temperature recovery period, whereby said plant is adapted to manipulate space temperature;

a microprocessor adapted to generate an error signal which is equal to a maximum difference between a current room temperature and said first preselected temperature when said current room temperature has at least reached said second preseleacted temperature, said microprocessor further being adapted to subtract said error signal from said second preselected temperature to create a new second preselected temperature for use in the next temperature recovery period; and a memory adapted to input, store and output a desired room temperature, said second preselected temperature and a new second preselected temperature.

3. A thermostat for minimizing the amount of time a plant is operating to return a space to a desired temperature, comprising:

a memory adapted to receive, store and output a desired temperature and a void temperature;

a PID controller; and a means for disabling said PID controller in electrical communication with said memory, said means for disabling being adapted to operate during the temperature recovery period until a room temperature is reached which is the desired temperature less the void temperature, said temperature recovery period being triggered by the occurrence of at least one preselected event, said means further being adapted to lock a plant on during said temperature recovery period, whereby said plant is adapted to manipulate space temperature.

4. The thermostat of claim 3, further comprising:

a comparator in communication with said memory, said comparator being adapted to generate an error signal which is equal to the maximum difference between a current room temperature and the desired temperature when said current room temperature is at least as great as the desired temperature;

a means for modifying said second preselected temperature in communication with said comparator, said means for modifying being adapted to subtract said error signal from said second preselected temperature to create a new second preselected temperature for use in a next temperature recovery period.

5. The device of claim 4 wherein said preselected event is said clock reaching a preselected time.

6. The device of claim 4 wherein said preselected event is said current room temperature rising above a preselected discomfort temperature.

7. The device of claim 4 wherein said preselected event is said current room temperature and a current room humidity level added together are above a preselected discomfort index.

8. The device of claim 4 wherein said preselected event is said current room temperature falling below a preselected discomfort temperature.

9. An energy saving temperature control system for an enclosed area, comprising:
   a plant;
   a temperature sensor; and
   a thermostat for controlling the operation of said plant being in electrical connection with said plant and said sensor, said thermostat being comprised of a memory adapted to receive, store and output first and second preselected temperatures and a void temperature, a PID controller, and a means for disabling a PID controller in electrical communication with said memory, said means for disabling being adapted to disable said PID controller during a temperature recovery period until a room temperature is reached which is the desired temperature less a void temperature said means for disabling further being adapted to lock on said plant.

10. The temperature control system of claim 9, further comprising:
   a comparator in communication with said memory, said comparator being adapted to generate an error signal which is equal to the difference between a current room temperature and the first preselected temperature when said current room temperature first reaches the second preselected temperature and then when the temperature of the enclosed space differs the most from the second preselected temperature;
   a means for modifying said second preselected temperature in communication with said comparator, said means for modifying being adapted to subtract said error signal from said second preselected temperature to create a new second preselected temperature for use in a next temperature recovery period.

11. The method of controlling the temperature of an enclosed space during a temperature recovery period, comprising the steps of:
   determining the existence of a temperature recovery period;
   disabling a PID controller;
   locking on a plant, said plant being adapted to manipulate space temperature;
   comparing the temperature of the enclosed space to a preselected void temperature;
   determining when the temperature of the enclosed space exceeds the void temperature;
   re-enabling the PID controller; and
   disabling said plant lock on.

12. The method of claim 11, comprising the further steps of:
   re-loading a constant to the PID controller for use by the integrator once re-enabling of the PID controller occurs;
   determining an error temperature which is representative of the overshoot of the temperature of the enclosed space beyond the desired temperature of the enclosed space; and
   adding the error temperature to the void temperature to create a new void temperature for use during the next temperature recovery period.

13. A thermostat for minimizing the amount of time a plant for manipulating space temperature is operating to return a space to a desired temperature, comprising:
   memory adapted to receive, store and output a desired temperature and a void temperature;
   a PID controller; and
   a means for locking a plant on during a temperature recovery period until a room temperature is reached which is a desired room temperature less a void temperature, said means for locking a plant on being in communication with said memory and said PID controller, said temperature recovery period being triggered by the occurrence of at least one preselected event, whereby said plant is adapted to manipulate space temperature.

* * * * *